J. M. HOTHERSALL.
BUCKET.
APPLICATION FILED APR. 15, 1915.

1,264,521. Patented Apr. 30, 1918.

Witnesses:

Inventor:
John M. Hothersall
By Munday, Evarts, Adcock & Clarke Attys

UNITED STATES PATENT OFFICE.

JOHN M. HOTHERSALL, OF BROOKLYN, NEW YORK, ASSIGNOR TO AMERICAN CAN COMPANY, OF NEW YORK, N. Y., A CORPORATION OF NEW JERSEY.

BUCKET.

1,264,521.  Specification of Letters Patent.  Patented Apr. 30, 1918.

Application filed April 15, 1915. Serial No. 21,576.

*To all whom it may concern:*

Be it known that I, JOHN M. HOTHERSALL, a citizen of the United States, residing in Brooklyn, in the county of Kings and State of New York, have invented a new and useful Improvement in Buckets, of which the following is a specification.

My invention relates to bail ears for buckets and the like and has particular reference to the connection formed in securing said bail ears to the body of the bucket or other member in which they are provided.

A principal object of the present invention is the provision of a bucket or the like provided with bail ears which are fastened in apertures in the body, wherein an improved and efficient connection between such bail ears and such body is effected.

A further object of the invention is the provision of such a structure which will be cheap to manufacture and of durable and permanently efficient character.

Other objects and advantages of the invention will be apparent as it is better understood from the following description when considered in connection with the accompanying drawing illustrating a preferred embodiment thereof.

For the purpose of illustrating my invention I have shown it embodied in a bucket comprising a body 5, a bail 6 and bail ears 7 which connect the bail with the body. The body and bail may have any desired or usual formation, the body being provided, however, with diametrically opposed apertures 8 in which the bail ears 7 are positioned.

Figure 1:
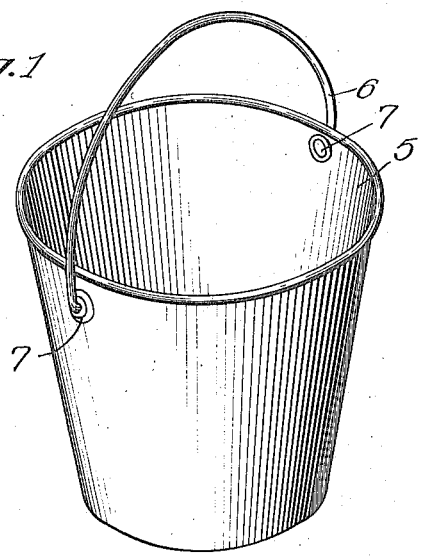
Figure 1 is a perspective view of a bucket embodying my invention.
Figure 4:
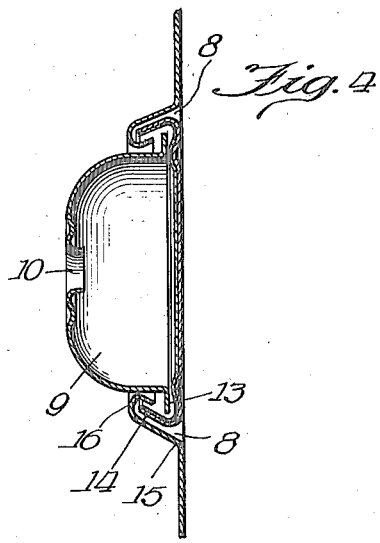
Fig. 4 is a similar view showing the parts assembled and ready for final seaming.
Figure 3:
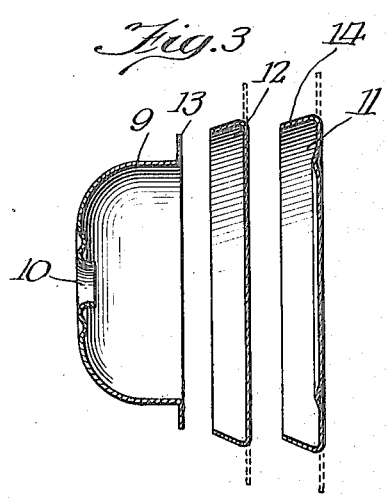
Fig. 3 shows the arrangement of the parts of the bail ear before assembling.
Figure 2:
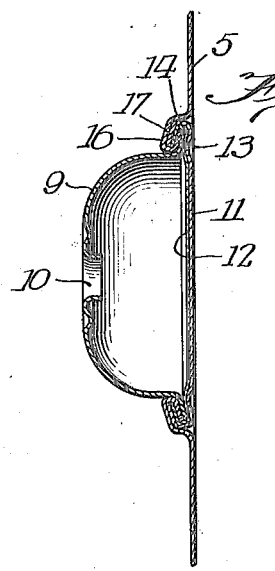
Fig. 2 is a section through the bail ear.

In the present instance, each bail ear consists of an outer member 9 through a suitable aperture 10 of which an end of the bail 6 may be pivotally connected, and of a backing sheet 11 which, as will be later described, is permanently interlocked with the outer member 9 and with the body, connecting all of the parts in a permanent joint which is rendered water or liquid tight by a paper gasket 12, provided and arranged as will be later described. The edge 13 of the outer member 9 is flared outwardly, as seen on the drawing, and the edge 14 of the backing sheet 11 is bent upwardly and past the perpendicular slightly to provide an outwardly extending flange through which the outer member may be inserted. The paper sheet 12 is inserted upon the inner face of the backing sheet 11 and is of similar form. Before securing the bail in place the edge of the body adjacent each aperture 8 is pressed outwardly at 15 and back upon itself at 16 to provide an offset hooked portion in which may be engaged the edge or flange 14 of the backing sheet 11, this portion, however, being of appropriate dimension to permit the body of the member 9 to pass through the aperture and to prevent passage of its flange 13. When the parts are thus formed they may be arranged as shown in Fig. 4, from which it will be noted that the flange 13 of the member 9 has been inserted within the flange 14 of the backing strip 11 and within also the paper sheet 12, and the two parts thus arranged positioned in an appropriate aperture 8 with the flange 14 engaged in the hooked portion 16. The bail ear is then firmly seamed in place by suitable mechanism which presses inwardly the hooked portion 16 and folds back the flange 14. This causes the hooked-over portion 16 to be bent down to the position shown in Fig. 2, from which it will be noted that an interlocked seam is formed between the three metal parts, namely, the outer member 9, the backing strip 11 and the body 5 of the bucket. The paper sheet 12 is disposed in full-face contact with all three members at the seam. For example, it is in full-face contact with the backing sheet 11 throughout its inner surface included in the seam. It is in contact with the adjacent surface of the flange 13 of the outer member and in contact also with the portion 17 of the body which is disposed behind the portion of the flange 14 which embraces it. This arrangement provides a water-tight connection when the parts are arranged as described, although it will be manifest that the paper sheet need not extend over all of each of the faces described. The connection is thus formed economically, as no expensive operations are necessary.

It is thought that the invention and many of its attendant advantages will be understood from the foregoing description, and it will be apparent that various changes may be made in the form, construction and arrangement of the parts without departing from the spirit of the invention or sacrificing any of its material advantages, the form hereinbefore described being merely a preferred embodiment thereof.

I claim:

1. A three-flange seamed structure forming a bail ear attachment, and comprising a packing gasket, the three parts consisting of an apertured vessel, an outer bail-receiving member, and a backing sheet, all of said flanges being seamed together, and said gasket being arranged to close the joint between the vessel and said outer member and the joint between said outer member and said backing sheet.

2. A three-flange seamed structure forming a bail ear attachment, and comprising a packing gasket, the three parts consisting of an apertured vessel, an outer bail-receiving member, and a backing sheet, all of said flanges being seamed together, said gasket being held in the backing sheet and being arranged to close the joint between the outer member and the flange of the aperture of the vessel.

Signed in the presence of two subscribing witnesses.

JOHN M. HOTHERSALL.

Witnesses:
W. D. FOSTER,
D. F. MENNIS.